May 9, 1961 — M. MARTHINSEN — 2,983,549
ICE CONTROLLER

Filed March 18, 1959 — 2 Sheets-Sheet 1

INVENTOR.
Mads Marthinsen.
BY James R. McKnight
Attorney.

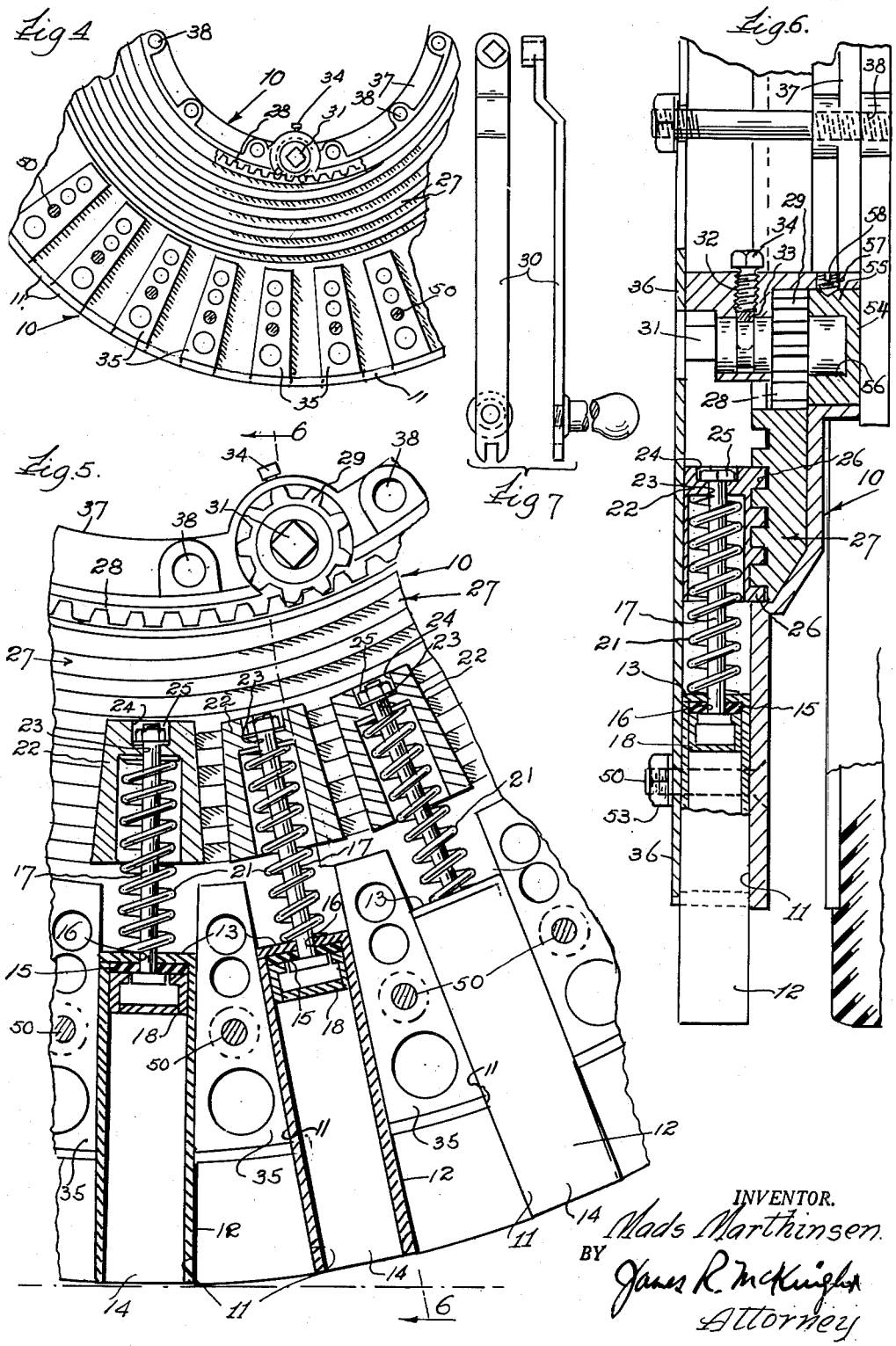

United States Patent Office 2,983,549
Patented May 9, 1961

2,983,549
ICE CONTROLLER
Mads Marthinsen, Chicago, Ill.
(1524 W. 45th St., Erie, Pa.)
Filed Mar. 18, 1959, Ser. No. 800,323
1 Claim. (Cl. 301—47)

This invention relates to a safety attachment for motor vehicles for control of skidding on icy pavements.

Among the objects of my invention is to provide an attachment removably attachable to the motor driven wheels of a motor vehicle, and attachably adapted to contact the ground at the outside base of the tires to prevent sidewise skid of the vehicle on ice or slippery surfaces.

Another object of my invention is to provide a safety device to stop large vehicles from skidding on slippery pavements, where most winter accidents occur. Vehicles have a tendency to slip sidewardly, while starting or stopping. My device eliminates such occurrences by means of pressure applied at the outside base of the tires to the ground.

My invention also has such other objects, advantages and capabilities as will later more fully appear and which are inherently possessed by my invention.

While I have shown in the accompanying drawings a preferred embodiment of my invention, yet it is to be understood that the same is susceptible of modification and change without departing from the spirit of my invention.

Figure 1:
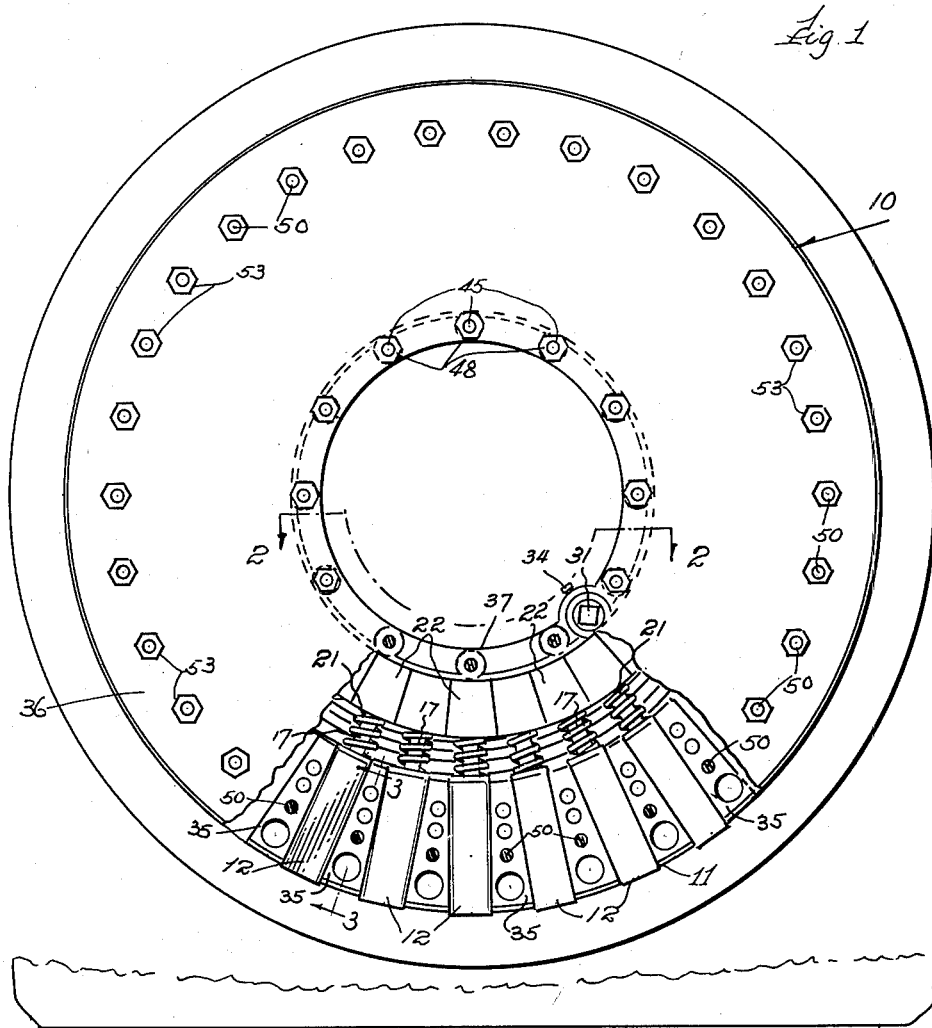
Figure 2:
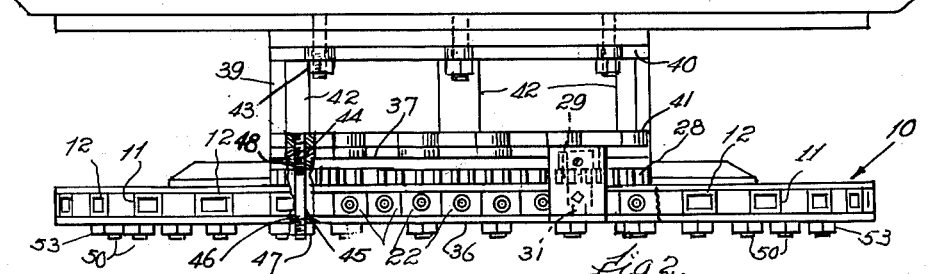
Figure 3:
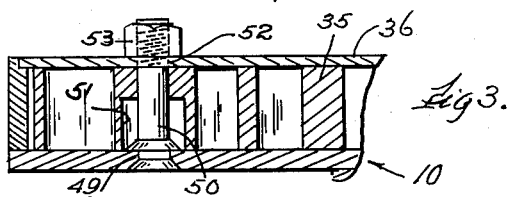

Referring to the drawings, Fig. 1 is a face view of my ice controller partly broken away; Fig. 2 is a top plan view partly in section on line 2—2 of Fig. 1 and showing my adaptor; Fig. 3 is an enlarged view on line 3—3 of Fig. 1; Fig. 4 is a fragmentary view showing a portion of my scroll and spacers; Fig. 5 is an enlarged sectional fragmentary view; Fig. 6 is detailed sectional view on line 6—6 of Fig. 5; and Fig. 7 shows front and side elevational views of my crank.

The embodiment selected to illustrate my invention comprises a circular frame member 10 having a plurality of spaced holes 11 extending about the periphery of the frame 10 and permitting movement therethrough of a plurality of spaced rectangular members 12. Each rectangular member 12 is preferably constructed of hardened steel and is of course hollow. At the top each rectangular member 12 is cut and bent to form a cover 13. Through an access hole 14 at the bottom of each tube 12 a rubber washer 15 is inserted and pressed into place around drilled hole 16 in the cover 13 of the tube. A long bolt 17 is admitted into each rectangular member 12 passing through the rubber washer 15 and the drilled hole 16. A cap 18 is pressed into each rectangular member to seal off the head of bolt 17 and washer 15 to protect them from dirt. The head of bolt 17 is also held in place by this cap 18 to prevent it from turning. Bolt 17 then passes through coiled spring 21. A block 22 is provided for each rectangular member 12. Each block 22 is bored out to admit its bolt 17 and spring 21. Each spring 21 is stopped by its block 22 but the bolt 17 continues on through a drilled hole 23 leading to a counter bored hole 24 in the top of each block. Here a nut 25 is inserted into the hole 24 and tightened on bolt 17. The rear of each block 22 is threaded at 26. Each block with its rectangular member is set into a scroll plate 27 having a corresponding threaded gear. Scroll plate 27 is round and the blocks 22 continue therearound until a circle is formed. At the edge of the scroll plate is another gear 28. This gear is meshed to a corresponding pitch gear pinion 29 housed in the top of the frame 10. A manual turning crank 30 is fitted to the shaft 31 on which the pitch gear pinion rotates. In frame 10 at its upper portion is a drilled threaded hole 32 into which a copper washer 33 is held by pressure of locking screw 34. The opposite side of the cranking device is used as a wrench to lock or unlock locking screw 34. A plurality of spaced guides 35 are used to hold the rectangular members in place and as spacers between the rear frame 10 and an outside baffle 36.

Frame 10 has an upper rim portion 37 with a plurality of spaced bolt holes 38 for direct attachment of my device to the lug bolts and nuts that attach the rims to the wheels of the vehicle with which my device is to be used.

In some instances, instead of my device being directly attached to the wheels of a vehicle, I provide an adapter which acts as a spacer and attaching means. The adapter 39 consists of an inner flange 40, and an outer flange 41 bound together by a plurality of spaced webs or supporting bars 42. The inner flange 40 has a plurality of drilled holes 43 through which pass the lug bolts of the vehicle. Nuts of the vehicle are then applied to the vehicle lug bolts and tightened to secure the adapter to the vehicle. The outer flange 41 has a plurality of threaded holes 44 for attachment by bolts 45. Said bolts 45 are threaded at each end and pass into drilled holes 46 in outer baffle 36 leaving part of the threads of one end protruding. Inside the outer baffle 36 at the running end of the bolt, a nut 47 is applied sufficiently to allow the thread to pass through the rear frame 10 and screw into the threaded holes 43 of the inner flange 40 of adapter 39 securely. The nuts 47 are then tightened against rear frame 10. At the opposite ends where the thread extends from the outer baffle 36, a nut 48 is applied and tightened against the outer baffle.

Outer cover or baffle 36 is also removably attached to frame 10 in the following manner: Said frame 10 has a plurality of drilled holes 49 counterbored to admit bolts 50 welded in place. Said bolts pass through counterbored holes 51 in guides 35 and drilled holes 52 in baffle plate 36. A nut 53 is tightened on each bolt 50 at the outside of baffle plate 36.

A dirt protector cap 54 is applied to the rear opening of the pitch gear pinion shaft 31. Said cap 54 has a lip 55 that sits flush with the pitch pinion gear 29 and has a counterbored hole 56 in the center to surround shaft 31. A hole 57 is drilled through the frame 10 and threaded. Into this hole a screw 58 is tightened into a digit cut into the cap 54. The screw 58 holds the cap 54 in place and prevents the cap from turning with the shaft 31.

In use, in making adjustment of my device, the locking screw 34 is unlocked. The turning crank is turned clockwise to apply pressure or counterclockwise to lessen pressure. When this is done, this is what happens: The pitch gear pinion meshes with the scroll plate and rotates the blocks attached to the threaded gear on the scroll plate up or down, depending on what is wanted. Turned in clockwise direction, the blocks press on the springs and they in turn press the rectangular members through the frame at the bottom, to apply more pressure on the pavement. Such pressure gripping the ice and pavement prevents sidewise skidding. Or, if turned oppositely, the blocks are threaded upwardly to release pressure of the springs on the rectangular members and the pavement.

Having thus described my invention, I claim:
An anti skid attachment for the wheel of a vehicle com- prising a circular frame member having in excess of twenty spaced holes extending about its periphery, a similar large number of hollow rectangular members of hardened steel movably mounted on said circular frame member, so that each rectangular member is positioned to move to and through a hole in said circular frame member, a bolt secured in each rectangular member, a spring coiled around each bolt, a block housing a bolt and a surrounding spring, each of said blocks having a threaded back, the blocks forming a circle, a scroll plate meshing with the threaded backs of said blocks, a pinion gear meshing with said scroll plate, crank means for moving said pinion gear, scroll plate and blocks in one direction for extending pressure on said blocks and said springs to move said rectangular members outwardly through the holes in said circular frame member, and in the other direction for releasing pressure on said blocks and said springs to move said rectangular members inwardly on said circular frame member, said circular frame member having a rim with spaced openings for attachment of said circular frame member to the wheel of the vehicle with the same lugs and nuts that hold the tire rim of the vehicle to the wheel and also for positioning said rectangular members immediately adjacent the tire of the vehicle for contacting the pavement at the inception of a sidewise skidding of the vehicle, said rectangular members having an open bottom with edges providing gripping action to prevent the skidding at the outset.

References Cited in the file of this patent

UNITED STATES PATENTS

| | | |
|---|---|---|
| 334,989 | Shellenberger | Jan. 26, 1886 |
| 504,086 | Johnson | Aug. 29, 1893 |
| 1,193,855 | Wright | Aug. 8, 1916 |
| 1,269,182 | Hollis | June 11, 1918 |
| 1,621,513 | Laughland | Mar. 22, 1927 |
| 2,174,944 | Leggett | Oct. 3, 1939 |
| 2,540,147 | Sutherland | Feb. 6, 1951 |

FOREIGN PATENTS

| | | |
|---|---|---|
| 261,876 | Great Britain | Dec. 2, 1926 |
| 498,623 | Great Britain | Jan. 11, 1939 |